United States Patent [19]
Hohensee et al.

[11] Patent Number: 5,907,708
[45] Date of Patent: May 25, 1999

[54] SYSTEM AND METHOD FOR FACILITATING AVOIDANCE OF AN EXCEPTION OF A PREDETERMINED TYPE IN A DIGITAL COMPUTER SYSTEM BY PROVIDING FIX-UP CODE FOR AN INSTRUCTION IN RESPONSE TO DETECTION OF AN EXCEPTION CONDITION RESULTING FROM EXECUTION THEREOF

[75] Inventors: Paul H. Hohensee, Nashua, N.H.; David L. Reese, Westborough, Mass.

[73] Assignee: Sun Microsystems, Inc., Palo Alto, Calif.

[21] Appl. No.: 08/657,112

[22] Filed: Jun. 3, 1996

[51] Int. Cl.[6] .......................................... G06F 9/44
[52] U.S. Cl. ..................... 395/703; 395/704; 395/568; 395/591
[58] Field of Search ..................... 395/703, 704, 395/739, 568, 591, 733

[56] References Cited

U.S. PATENT DOCUMENTS 5,210,832  5/1993  Maier et al. ............................ 395/568
5,479,616  12/1995 Garibay, Jr. et al. .................... 395/388
5,596,733  1/1997  Worley, Jr. et al. .................... 395/591

Primary Examiner—Kenneth S. Kim
Attorney, Agent, or Firm—Richard A. Jordan

[57] ABSTRACT

A system for avoiding exceptional conditions during execution of a program comprises an execution environment for executing the program and a fix-up code generation subsystem. The program comprises an instruction stream comprising a series of instructions, and the execution environment includes an exceptional condition detector for detecting at least one predetermined type of exceptional condition in connection with execution of each instruction in the instruction stream. The fix-up code generation subsystem is responsive to detection by the execution environment of an exceptional condition of the predetermined type in connection with execution of an instruction in the instruction stream for generating fix-up code which, when processed, would avoid the exceptional condition of that predetermined type, and substitutes the fix-up code in the instruction stream for the instruction in the instruction stream for which the at least one exceptional condition was detected. As a result, if the instruction which gave rise to the exception is in a loop or the like, instead of the instruction being processed, the fix-up code will be processed, which will avoid the exception condition.

33 Claims, 5 Drawing Sheets

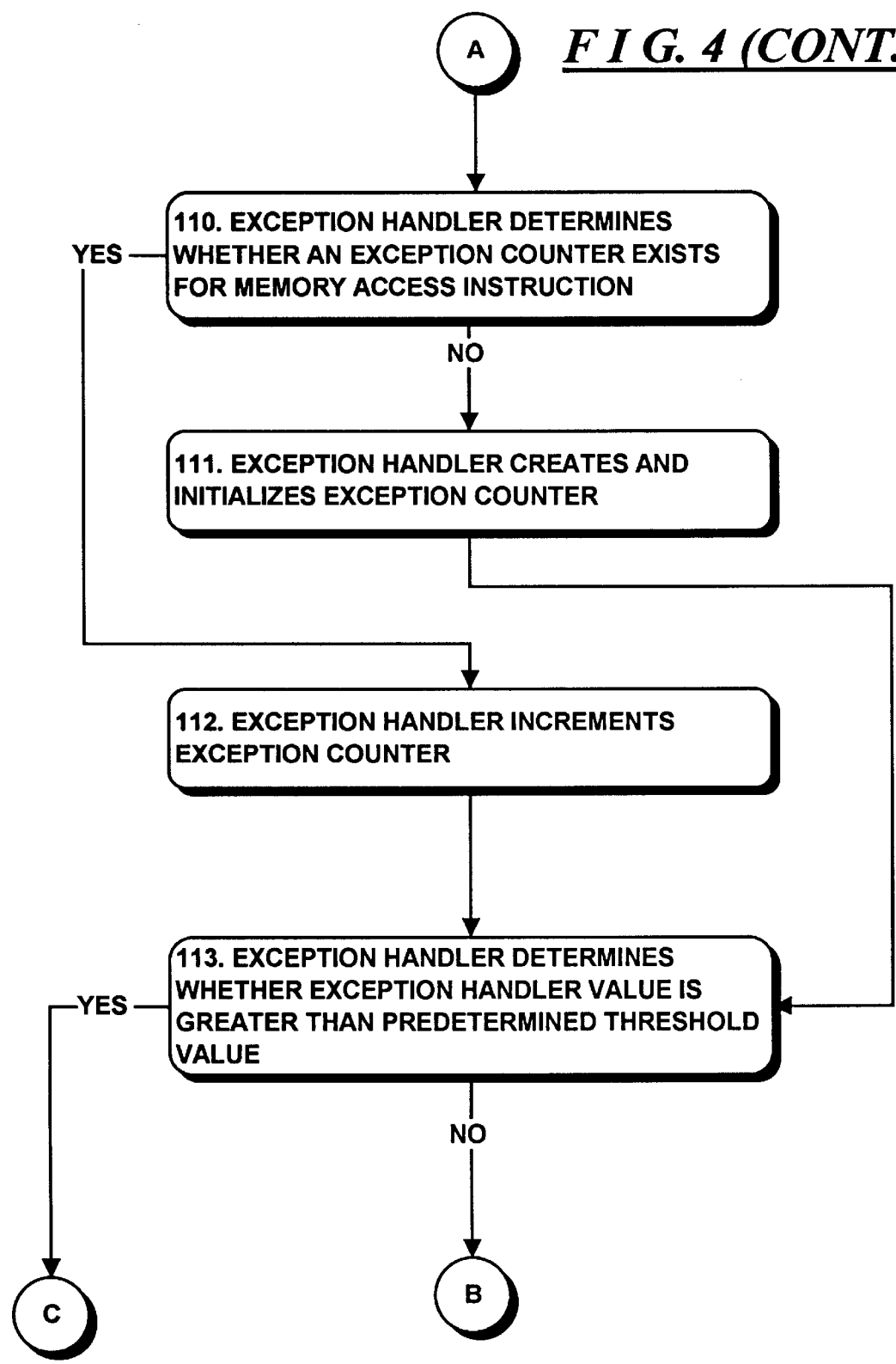
FIG. 4 (CONT. A)

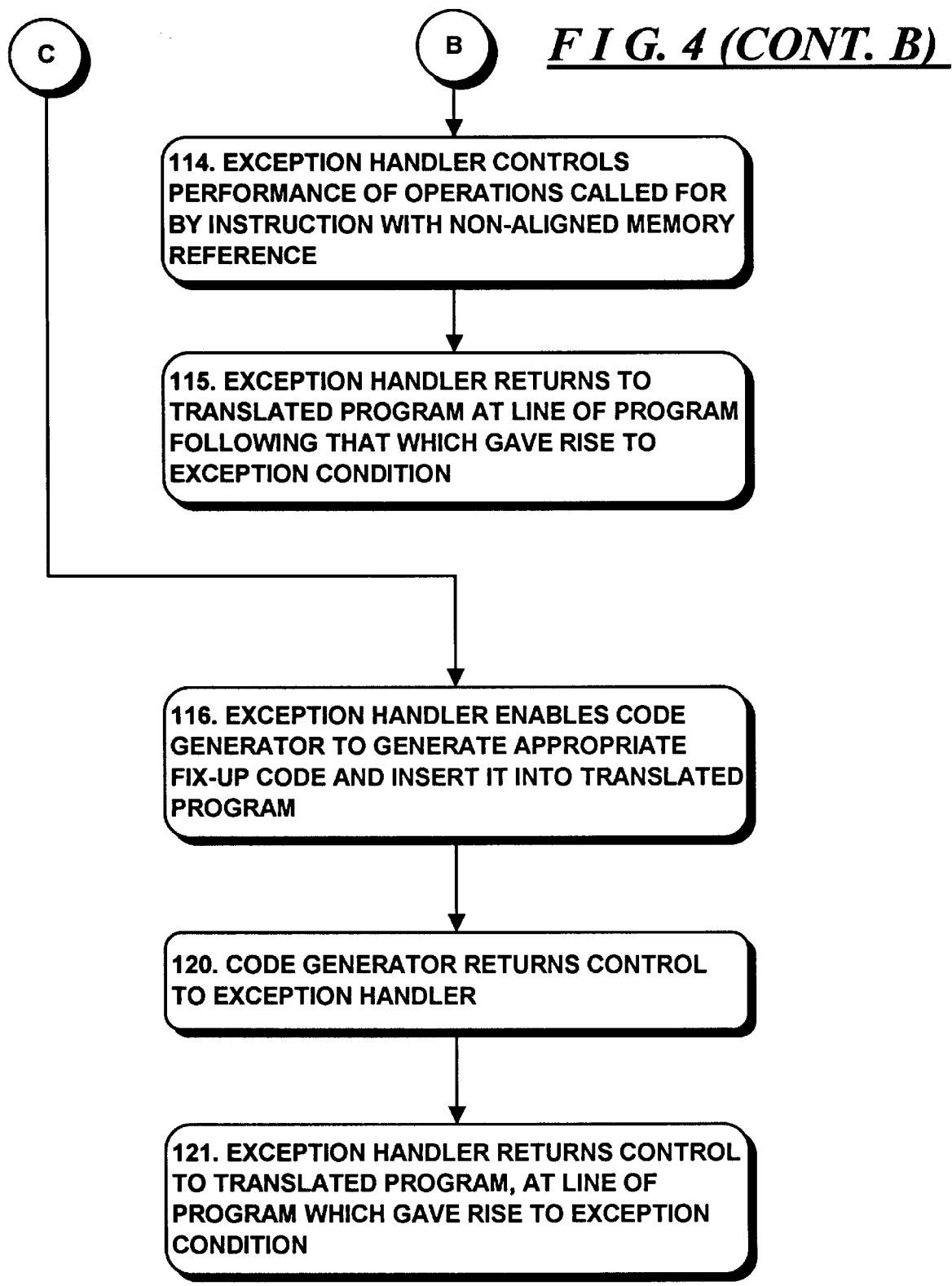

SYSTEM AND METHOD FOR FACILITATING AVOIDANCE OF AN EXCEPTION OF A PREDETERMINED TYPE IN A DIGITAL COMPUTER SYSTEM BY PROVIDING FIX-UP CODE FOR AN INSTRUCTION IN RESPONSE TO DETECTION OF AN EXCEPTION CONDITION RESULTING FROM EXECUTION THEREOF

FIELD OF THE INVENTION

The invention relates generally to the field of digital computer systems, and more particularly to systems and methods for facilitating avoidance of an exception of a predetermined type in a digital computer system. The invention particularly provides a system and method for facilitating the efficient handling of memory access operations involving non-aligned memory references by a microprocessor that would require use of an exception handler to handle the non-aligned memory reference.

BACKGROUND OF THE INVENTION

Digital computers process a variety of diverse types of programs, with each program including a series of instructions that enable the computer to perform specific operations in connection with specific elements of data. A variety of types of processors are available for use in digital computer systems, with each type of processor being constructed in accordance with an architecture which describes, inter alia, the set of instructions that a processor constructed in accordance with the architecture is expected to execute, the format(s) of the various instructions, the types and formats of data which may be processed, definitions for various registers that may be used during instruction processing, how information in the computer's memory will be accessed and how a processor constructed in accordance with the architecture is to handle exception conditions which may be detected during instruction processing.

It is often desirable to enable one type of processor, as an "emulated processor," to be emulated by another type of processor, as a "host processor." A host processor generally emulates an emulated processor by processing programs which have been written for the emulated processor, to generate an output that effectively corresponds to the output that would be generated by the emulated processor. Generally, emulation is accomplished by translating a program generated for execution by an emulated processor (an "original" program) into a program which may be processed by a host processor (a "translated" program). This translation process may include, for example, generating from instructions and other elements of the original program, instructions and other elements which are based on the host processor's architecture thereby to provide the translated program. The translation may be performed by, for example, the host processor itself, by another processor in the same computer system or by another computer system and made available to the host processor which is to process the program, under control of a translation program. In performing the translation, each instruction or sequences or various groups of instructions in the original program (that is, the program based on the emulated processor's architecture) may be translated into one or a series or group of instructions for processing by the host processor. The translation process is typically performed for all or selected portions of an original program when the processor begins processing the original program, although it will be appreciated that an instruction or group of instructions of the original program may be translated as the processing proceeds. In addition, if the emulated processor's data formats are not directly useable by the host processor, the data may be processed to convert it from the emulated processor's formats to formats usable by the host processor.

As noted above, an architectural definition includes a description of how a processor constructed in accordance with the architecture accesses information in the computer's memory. Normally, data is stored in a memory subsystem which includes a series of storage locations, each of which has the capacity to store an eight-bit byte of data, and which are associated with a corresponding series of successive address values. Typically, a processor can process items of data, each comprising, for example, one, two, four, eight and so forth, bytes (generally, quantities of $2^n$ bytes, where "n" is an integer), and modern processor architectures typically require that the data items be stored in an "aligned" fashion. That is, the architectures require that two-byte data items be stored in memory locations that are accessed having addresses that are divisible by two, and that four-byte and eight-byte, data items be stored in memory locations that are accessed having addresses that are divisible by four. If a data item is not properly aligned, typically the memory subsystem or the processor would need to perform a series of operations, after the contents of one or more storage locations are retrieved during a retrieval operation, to reorganize the contents and extract the desired data item from the retrieved contents, or during a storage operation, to re-organize the data item and store it in one or more storage locations.

For processors constructed in accordance with such modem architectures, if a memory access were to make use of an address that is not properly aligned, typically an exception handler would be called to handle the operation. The exception handler may control the processor to perform a number of operations to enable the contents of a number of storage locations to be retrieved and the data item fabricated from portions of the retrieved contents, during a retrieval operation, or to disassemble various portions of the data item and store them in respective storage locations, in a storage operation. Alternatively, to avoid the significant amount of overhead which would be encountered in calling the exception handler, performing the remedial operations, and returning to the program, the exception handler may merely enable the processor to terminate the program which made use of the non-aligned address reference. To avoid either of these, typically compilers provide that data items are laid out in the memory to ensure that non-aligned references are avoided.

However, a number of older architectures, illustratively the Intel Corporation x86 family of microprocessors, which currently includes its 8086, 8088, 80286, 80386, 80486 and "Pentium™" lines of microprocessors, permit non-aligned references. A problem arises, however, if it is desired to enable a "host" processor, which is constructed according to one of the modern architectures which requires that memory accesses be aligned, to emulate an emulated processor which does not require such alignment, since a non-aligned reference may be encountered during such emulation.

SUMMARY OF THE INVENTION

The invention provides a new and improved system and method for facilitating avoidance of an exception of a predetermined type in a digital computer system, particularly facilitating the efficient handling of memory access operations involving non-aligned memory references by a microprocessor that would require use of an exception handler to handle the non-aligned memory reference.

In brief summary, a system for avoiding exceptional conditions during execution of a program comprises an execution environment for executing the program and a fix-up code generation subsystem. The program comprises an instruction stream comprising a series of instructions, and the execution environment includes an exceptional condition detector for detecting at least one predetermined type of exceptional condition in connection with execution of each instruction in the instruction stream. The fix-up code generation subsystem is responsive to detection by the execution environment of an exceptional condition of the predetermined type in connection with execution of an instruction in the instruction stream for generating fix-up code which, when processed, would avoid the exceptional condition of that predetermined type, and substitutes the fix-up code in the instruction stream for the instruction in the instruction stream for which the exceptional condition was detected. As a result, if the instruction which gave rise to the exception is in a loop or the like, instead of the instruction being processed, the fix-up code will be processed, which will avoid the exception condition.

Thus, the system allows for use, in an instruction stream, of instructions which may be efficiently processed, but which may give rise to exceptional conditions such as non-aligned memory references, and for substituting therefor "fix-up" code which may be less efficient but which will ensure that exceptional conditions will be avoided if an exceptional condition is detected in the processing of the original instruction. Thus, if the portion of the program containing the instruction which gave rise to the exceptional condition is processed a number of times, which can occur if it forms part of a loop, the exceptional condition will be encountered only once, or a predetermined number of times, and thereafter the substitute code will be processed, thereby ensuring that the exceptional condition will be avoided.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
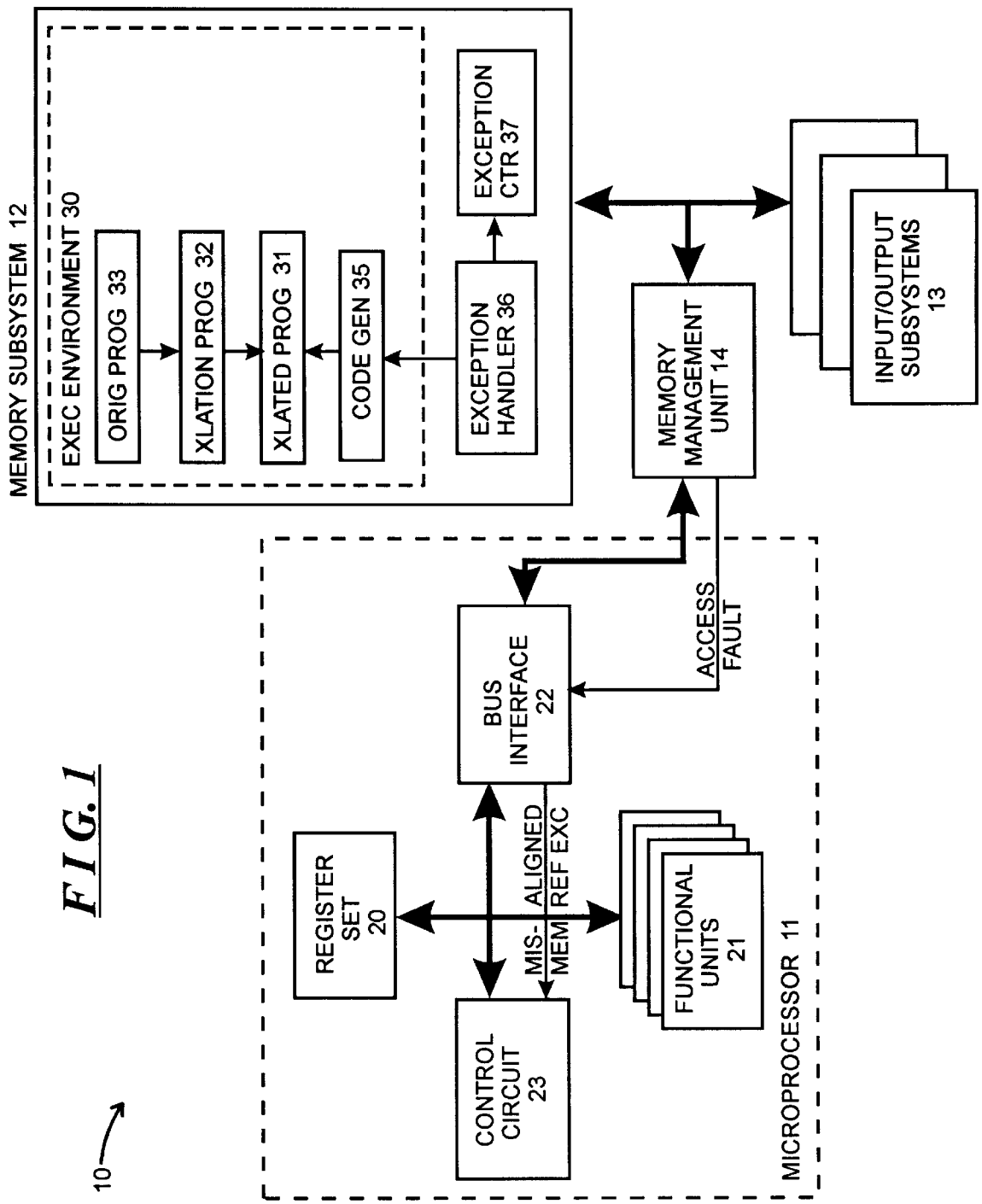
FIG. 1 is a functional block diagram depicting a digital computer system constructed in accordance with the invention.

FIG. 1 is a functional block diagram of a digital computer system 10 including a system for facilitating the efficient handling of memory access operations involving non-aligned memory references by a microprocessor that would require use of an exception handler to handle the non-aligned memory reference. With reference to FIG. 1, the digital computer system 10 includes a microprocessor 11 which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

In one embodiment, a microprocessor 11 useful in system 10 comprises a microprocessor constructed in accordance with the SPARC Version 9 architecture described in the SPARC International, Inc [David L. Weaver and Tom Germond (eds)], *The SPARC Architecture Manual Version 9* (Prentice-Hall, 1994) (hereinafter referred to as "the SPARC Architecture Manual, Version 9"). The microprocessor 11 generally includes a number of elements, including a register set 20, one or more functional units 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage. The SPARC Version 9 architecture is one of a class of architectures termed "load/store" architectures, in which memory access operations, in which data is retrieved from or stored in, for example, the memory subsystem 12 or registers (not shown) in the input/output subsystems 13, are handled using "load" and "store" instructions, respectively, which will generally be referred to in the singular as a "memory access instruction" and in the plural as "memory access instructions."

Figure 2:
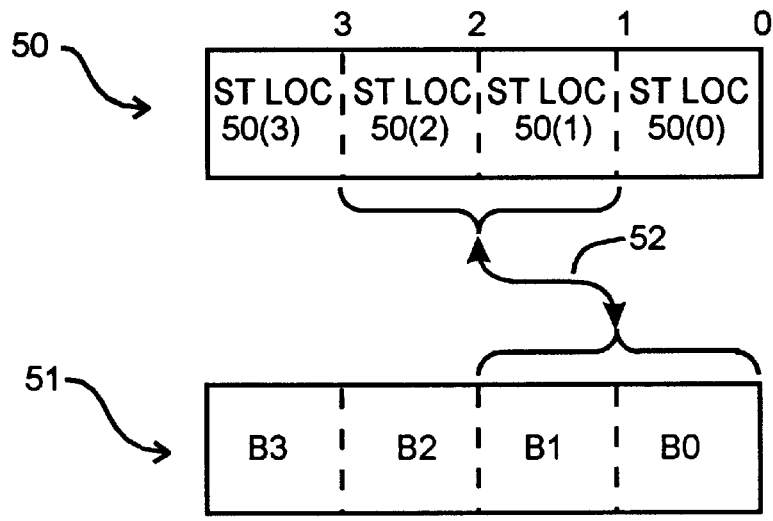
FIGS. 2 and 3 are diagrams which are useful in understanding the invention.

The invention provides an arrangement whereby a microprocessor, such as microprocessor 11, which requires memory references to be on aligned address boundaries, and for which non-aligned memory references, that is memory references which are not on aligned address boundaries, would trigger an exception, is enabled to efficiently emulate a microprocessor, such as a microprocessor of the Intel x86 family, which does not require memory references to be so aligned. Aligned and non-aligned memory references will generally be described in connection with FIGS. 2 and 3. With reference initially to FIG. 2, that FIG. depicts a word storage location 50, which may be, for example, a location in the memory subsystem 12, and a register 51, which comprises a register in the register set 20. The storage location 50 comprises four byte storage locations 50(0) through 50(3), each of which is identified by an respective address "0" through "3." The register 51 comprises four byte storage locations $B_0$ through $B_3$. If the microprocessor 11 initiates a memory access operation such as, for example, a "load word" operation, to retrieve a data item comprising the four bytes in storage location 50, the contents of byte storage locations 50(0) through 50(3) of the storage location 50 will be transferred into respective byte storage locations $B_0$ through $B_3$ of the register 51. For such a memory access operation, the microprocessor 11 would use the value "0" as the address, which is the "base" of the storage location 50.

On the other hand, if the microprocessor 11 initiates a memory access operation such as a "load half-word" operation (where a "half-word" is a two-byte data item), the contents of byte storage locations 50(i) and 50(i+1) will be transferred into respective byte storage locations $B_0$ and $B_1$ of the register 51, where index "i" corresponds to the address that the microprocessor 11 would use for the operation. If the value of "i," that is, the address used for the memory access operation, is "0" or "2," the reference is "aligned." On the other hand, if the value of "i" is "1" or "3," the reference is non-aligned. Similar operations occur in connection with a "store half-word" operation, with the contents of byte storage locations $B_0$ and $B_1$ of register 51 being transferred into byte storage locations 50(i) and 50(i+1) of the storage location 50. Thus, in the memory access operation represented by arrow 52 as shown in FIG. 2, which represents a memory access operation with a non-aligned memory reference in which the address is "1," the data item would be transferred into byte locations $B_0$ and $B_1$ of the register 51 during a load operation, or from byte locations $B_0$ and $B_1$ of register 51 during a store operation.

Further, if the microprocessor initiates a memory access operation such as a "load byte" operation, the contents of storage location 50(i) will be transferred into byte storage location $B_0$ of the register 51, where "i" corresponds to the address that the microprocessor 11 would use for the operation. For such memory access operations are aligned, regardless of the value "i" used as the address. Similar operations occur in connection with a "store byte" operation, with the contents of byte storage location $B_0$ of register 51 being transferred into byte storage location 50(i) of the storage location 50.

Figure 3:
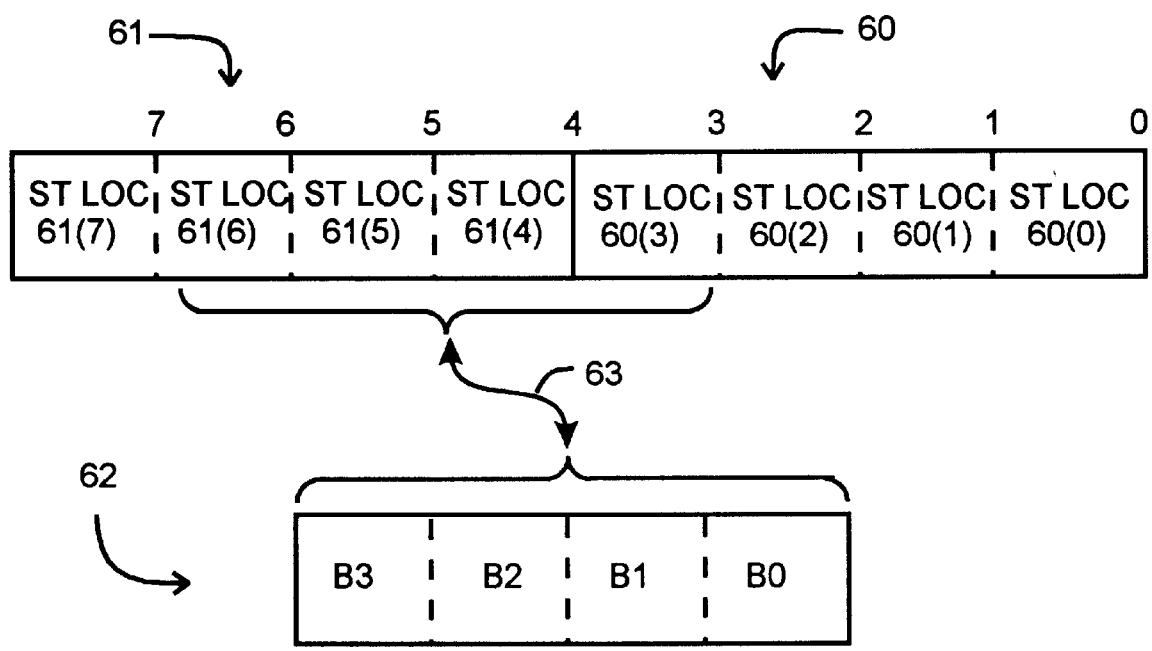

Non-aligned memory references can also be encountered in connection with a "load word" or "store word" memory access operation, as will be described in connection with FIG. 3. FIG. 3 depicts two successive word storage locations 60 and 61 in, for example, memory subsystem 12, and a register 62 in the register set 20. Word storage location 60 comprises four byte storage locations 60(1) through 60(3), each identified by a respective address "0" through "3." Similarly, word storage location 61 comprises four byte storage locations 61(4) through 61(7), each identified by a respective address "4" through "7." The register 62 comprises four byte storage locations $B_0$ through $B_3$. If the microprocessor 11 initiates a memory access operation such as a "load word" operation, the contents of four successive byte storage locations beginning with the byte storage location having address "i" corresponding to the address that the microprocessor 11 would use for the operation, will be transferred into byte storage locations $B_0$ through $B_3$ of the register 62. If the value of "i," that is, the address used for the memory access operation, is "0" or "4," the reference is "aligned." On the other hand, if the value of "i" has any other value, the reference is non-aligned. Similar operations occur in connection with a "store word" operation, with the contents of byte storage locations $B_0$ through $B_3$ of register 62 being transferred into four successive byte storage locations of the storage location 60 beginning with the byte storage location identified by address "i". Thus, in the memory access operation represented by arrow 63 as shown in FIG. 3, which represents a memory access operation with a non-aligned memory reference in which the address is "3," with the data item transferred into from byte storage locations 60(3) and 61(1) through 61(2) into byte locations $B_0$ through $B_3$ of the register 51 during a load operation, or from byte locations $B_0$ through $B_3$ of register 51 during a store operation.

With reference again to FIG. 1, the microprocessor 11 which requires memory references to be aligned will referred to herein as the "host" microprocessor 11, and the microprocessor which allows for non-aligned memory references will be referred to herein as the "emulated" microprocessor. Normally, if the microprocessor 11, while processing a program, encounters a memory access instruction which contains a memory reference which is not aligned, the microprocessor 11 would call an exception handler to handle the exception, and typically, the operation of calling, processing and returning from an exception handler can take a considerable amount of processing time. Accordingly, requiring the microprocessor 11 to call an exception handler to handle instructions which contain non-aligned memory references can result in inefficient emulation of the emulated microprocessor. The invention provides an arrangement which can reduce the number of times the microprocessor 11 would need to call an exception handler for such instructions, particularly when such an instruction is encountered more than a selected number of times, which can occur when the instruction is contained in a loop. In accordance with the invention, if the microprocessor 11, as host microprocessor emulating an emulated microprocessor, encounters an instruction of a program being emulated which has a non-aligned memory reference, a code generator will be enabled to generate additional code for the program being emulated to be executed in place of the instruction. The additional code will enable the microprocessor 11 to perform the operations that would be performed by the exception handler in handling the instruction. Since the additional code is processed as part of the program emulation, no exception handler needs to be called, which can enhance the efficiency of the emulation.

More specifically, the invention provides an arrangement which enables the host microprocessor 11, while processing, in an execution environment 30, a "translated" program 31 which is generated by a translation program 32, to emulate operations performed by an emulated microprocessor (not shown) in processing an "original" program 33 that was written for the emulated microprocessor, and in particular an arrangement that enables the host microprocessor 11 to efficiently emulate the manner in which the emulated microprocessor handles memory access instructions which use non-aligned memory references. In accordance with the invention, the host microprocessor 11, when it first encounters a memory access instruction in the translated program 31, that includes a non-aligned memory reference, first calls an exception handler 36 to handle the exception and effectively emulate the memory access instruction.

In addition, the first time the exception handler 36 is called to handle the exception, the exception handler 36 will establish and initialize a counter 37 associated with the memory access instruction. Each subsequent time the exception handler 36 is called for the same instruction in, for example, a loop, it (that is, the exception handler) will increment the counter 37 and compare the count value provided by the counter 37 to a predetermined threshold value. If the count value provided by the counter 37 has a predetermined correspondence to the threshold value (for example, if the count value is equal to or greater than the threshold value), the exception handler 36 will enable a code generator 35, which is also provided as part of the execution environment 30, to generate additional code which will be processed, as part of the translated program, to effectively emulate the memory access instruction to handle the non-aligned memory reference. Thereafter, instead of processing the memory access instruction, the additional code would be executed, thereby to emulate the memory access instruction without the necessity of calling the exception handler 36. Emulation of the memory access instruction in this manner can enhance processing efficiency since it will not require the overhead of calling and returning from the exception handler. It will be appreciated that, if the additional code is to be generated the first time the exception handler 36 is called, no counter 37 need be provided.

A specific example will assist in understanding the operation of invention. In this example, it will be assumed that the translated program 31 includes program code in the following Code Segment A:

Code Segment A

| | | | |
|---|---|---|---|
| (1) | <misc code> | | |
| (2) | ld uh [r1], r2 | ; | load unsigned half-word, from memory location identified by address in register r1, into register r2 |
| (3) | <misc code> | | | where registers r1 and r2 are registers in the microprocessor's register set 20. The program code in Code Segment A identified by "misc code" corresponds to program code which is prior to the code in line (2) in the translated program 31, in the case of line (1), and after the code in line (2), in the case of line (3).

The instruction in line (2) of Code Segment A initiates a memory access operation to retrieve a half-word data item from the memory location whose address is set forth in register r1 and load it into register r2. If the address in register r1 is even, the data item is in an aligned condition, in which case the memory access operation can proceed without an exception occurring. However, if the address in register r1 is odd, the data item is not aligned. The exception handler 36 will be called to emulate the instruction, effectively enabling the microprocessor 11 to perform the series of instructions in Code Segment B:

Code Segment B

| | | | |
|---|---|---|---|
| (1) | ld ub [r1], r2 | ; | load unsigned byte, from memory location identified by address in register r1, into register r2 |
| (2) | ld ub [r1 + 1], r3 | ; | load unsigned byte, from next memory location following that identified by address in register r1, into register r3 |
| (3) | shl r2, 8, r2 | ; | shift value in register r2 in the left direction one byte (eight bits) |
| (4) | or r2, r3, r2 | ; | OR contents in registers r2 and r3 and load into register r2 |

In performing the operations represented by lines (1) and (2), the microprocessor 11, under control of the exception handler 36, will retrieve bytes of data comprising respective portion of the data item from the byte storage location identified by the address value contained in register r1 (line (1)), and from the next storage location, that is, the byte storage location identified by the address value contained in register r1 incremented by one (line (2)), and load the retrieved bytes into registers r2 and r3. Each register in the register set 20 comprises a predetermined number of byte data storage locations <$B_N$ ... $B_0$>, and the instructions in lines (1) and (2) will enable the respective retrieved byte to be stored in the low-order byte storage location $B_0$. In addition, the other byte data storage locations <$B_N$ ... $B_1$> in each register r2 and r3 will contain bits each having the binary value "zero."

In performing the operation represented by line (3) in Code Segment B, the microprocessor 11, continuing under control of the exception handler 36, will shift the retrieved byte from the low-order byte storage location $B_0$ to the next byte storage location $B_1$ in the register r2, and load bits having respective value "zero" into the low-order byte storage location $B_0$. In performing the operation represented by line (4), the microprocessor 11 will "inclusive" OR the contents of registers r2 and r3 and store the result in register r2. That operation will effectively result in the low-order byte storage location $B_0$ of register r2 receiving the contents of the low-order byte storage location $B_0$ of register r3, since the other byte storage locations <$B_N$ ... $B_1$> all contain the logical value "zero" and so the "inclusive" OR operation will leave the corresponding byte storage locations <$B_N$ ... $B_1$> of register r2 unchanged. Accordingly, after performing the operations described in connection with Code Segment B, the microprocessor 11 will have constructed the non-aligned half-word (two-byte) data item in the storage location in memory subsystem 12 identified by the address in register r1, by performing the two retrieval operations (lines (1) and (2)) to obtain respective portions of the half-word and respective operations (lines (3) and (4)) effectively to fabricate the half word from the respective portions.

It will be appreciated that corresponding operations as described above in connection with Code Segment B may be performed in connection with a storage operation, to store a non-aligned half-word in a storage location in memory subsystem 12. That is, the microprocessor 11 can copy a two-byte data item in a register, such as contained in byte storage locations $B_1$ and $B_0$ of register r2, into a register such as register r3 and shifted to the right so that the contents of the lower-order byte storage location $B_0$ of the register r3 correspond to the contents of the byte storage location $B_1$ of register r2. Thereafter, the microprocessor can perform a store "byte" storage operation using the address in register r1 to store the contents of byte location $B_0$ of register r2 in the storage location in memory subsystem 12 identified by register r1, and a second store "byte" storage operation using the incremented address in register r1 to store the contents of byte location $B_0$ of register r3 in the storage location in memory subsystem 12 identified by the incremented address.

It will further be appreciated that the exception handler 36 may enable the microprocessor 11 to perform similar operations in connection with a load or a store operation in connection with a data word comprising a four-byte word. The exception handler 36 could enable the microprocessor 11 to perform four memory access operations, each to retrieve or store respective bytes of the word. For a load operation, the exception handler 36 would enable the microprocessor 11 to copy the respective retrieved bytes into respective registers, perform shift operations so that the bytes are in respective byte storage locations $B_3$ through $B_0$ of the respective registers, and an OR operation to OR the contents of the registers into a single register, which single register contains the retrieved word.

However, with reference to FIG. 3, a memory access operation in connection with a non-aligned word memory reference can more efficiently be processed using two aligned half-word accesses, it for example, the memory reference uses as an address "2" or "6," or as a single half-word access and two byte accesses, if, for example the memory reference uses as an address "1," "3," "5" or "7." Thus, if the memory access operation is a load operation for which the memory reference uses "2" as an address, the microprocessor 11, under control of the exception handler 36, can enable two half-word load operations to be performed using addresses "2" and "4," each of which is an aligned reference, with the retrieved half-words being stored in respective registers in the register set 20. Thereafter, the exception handler 36 can enable the contents of the register containing the half-word retrieved using address "4" to be shifted into byte storage locations $B_2$ and $B_3$, and the to OR the contents of the two registers together. Similarly, if the memory access operation is a store operation for which the memory reference uses "2" as an address, the exception handler 36 can enable the microprocessor to copy the contents of the register containing the word to be stored in a second register, to shift the contents of the second register so that the bytes originally contained in byte storage locations $B_3$ and $B_2$ are respectively in byte storage locations $B_1$ and $B_0$, and perform store half-word operations in connection with the contents of the two registers to store the respective half-words in memory storage location identified by addresses "2" and "4," respectively.

On the other hand, if the memory access operation is a load operation for which the memory reference uses "1" as the address, the exception handler can enable the microprocessor 11 to perform (i) a load byte operation using "1" as an address to retrieve the byte in that storage location and store it in a first register, (ii) a load half-word operation using the incremented address "2" (that is, address "1" incremented by "1," since the first operation (i) was for a byte stored in a single addressed storage location), to retrieve the half-word starting in that storage location, and store it in a second register, and (iii) a load byte operation using the further incremented address "4" (that is, address "2" incremented by "2," since the second operation (ii) was for a half-word stored in two consecutive storage locations) and store it in a third register.

Thereafter, the exception handler 36 can enable the microprocessor to shift the bytes in the respective registers into the appropriate storage locations and OR the contents of the registers together to generate the word. The exception handler 36 can enable the microprocessor 11 to perform similar operations if the non-aligned memory reference uses the address "3", "5" or "7." In addition, operations enabled by the exception handler 36 in connection with a store operation will be apparent to those skilled in the art. Furthermore, operations enabled by the exception handler in connection with load and store operations in connection with larger data items and/or other addresses will also be apparent to those skilled in the art.

In accordance with the invention, the exception handler 36, in addition to controlling the microprocessor 11 to perform the operations described above in connection with Code Segment B, will generally also enable the code generator 35 to provide code described below in connection with Code Segment C (for a half-word load with a misaligned memory reference):

Code Segment C

| (1) | | <misc code> | |
|---|---|---|---|
| (2) | | ba Fixup | ; unconditional branch "always" to code with label "Fixup" |
| (3) re-sume | | <misc code> | |
| (4) | Fixup | ld ub [r1], r2 | ; load unsigned byte, from memory location identified by address in register r1, into register r2 |
| (5) | | ld ub [r1 + 1], r3 | ; load unsigned byte, from next memory location following that identified by address in register r1, into register r3 |
| (6) | | shl r2, 8, r2 | ; shift value in register r2 in the left direction one byte (eight bits) |
| (7) | | or r2, r3, r2 | ; OR bytes in registers r2 and r3 and load into register r2 |
| (8) | | ba resume | ; unconditional branch "always" to code with label "resume" |

The code identified by "misc code" in lines (1) and (3) of Code Segment C corresponds to the original translated program 31 for the correspondingly-numbered lines of Code Segment A of the translated program 31. The code identified by lines (4) through (7) correspond to Code Segment B. The code in line (2), which the code generator 35 substitutes for the code in line (2) of Code Segment A of the translated program, enables the microprocessor 11 to branch to the instruction labeled "Fixup," which corresponds to the first instruction in the Code Segment B, effectively enabling the microprocessor 11 to process the instructions in Code Segment B. The code in line (7) of Code Segment C enables the last operation described above in connection with Code Segment B, and the instruction in line (8) of Code Segment C enables the microprocessor 11 to branch to the instruction of the translated program code labeled "resume," which corresponds to the first instruction in the <misc code> in line (3) of the original translated program code 31. Thus, the code generator 35 substitutes the code in lines (2) and (4) through (8) of Code Segment C, for code in line (2) of Code Segment A, in the translated program 31.

As a result, if the microprocessor 11 processes Code Segment C, which it may do if the Code Segment A forms part of a loop, the microprocessor 11, instead of encountering an instruction, such as the instruction in line (2) of Code Segment A, that would result in calling of the exception handler 36, it (that is, the microprocessor 11) would execute the Code Segment C generated by the code generator 35, which would facilitate emulation of the substituted instruction without requiring the exception handler 36 to be called. Since the microprocessor 11 accomplishes these operations without the necessity of calling the exception handler 36, processing efficiency for the translated program is enhanced, since the microprocessor 11 can avoid the processing overhead that would otherwise be required by calling the exception handler 36.

The code generator 35 can also generate corresponding program code for store operations and for word and other size data items, the specific code for which will be readily apparent to one skilled in the art.

Figure 4:
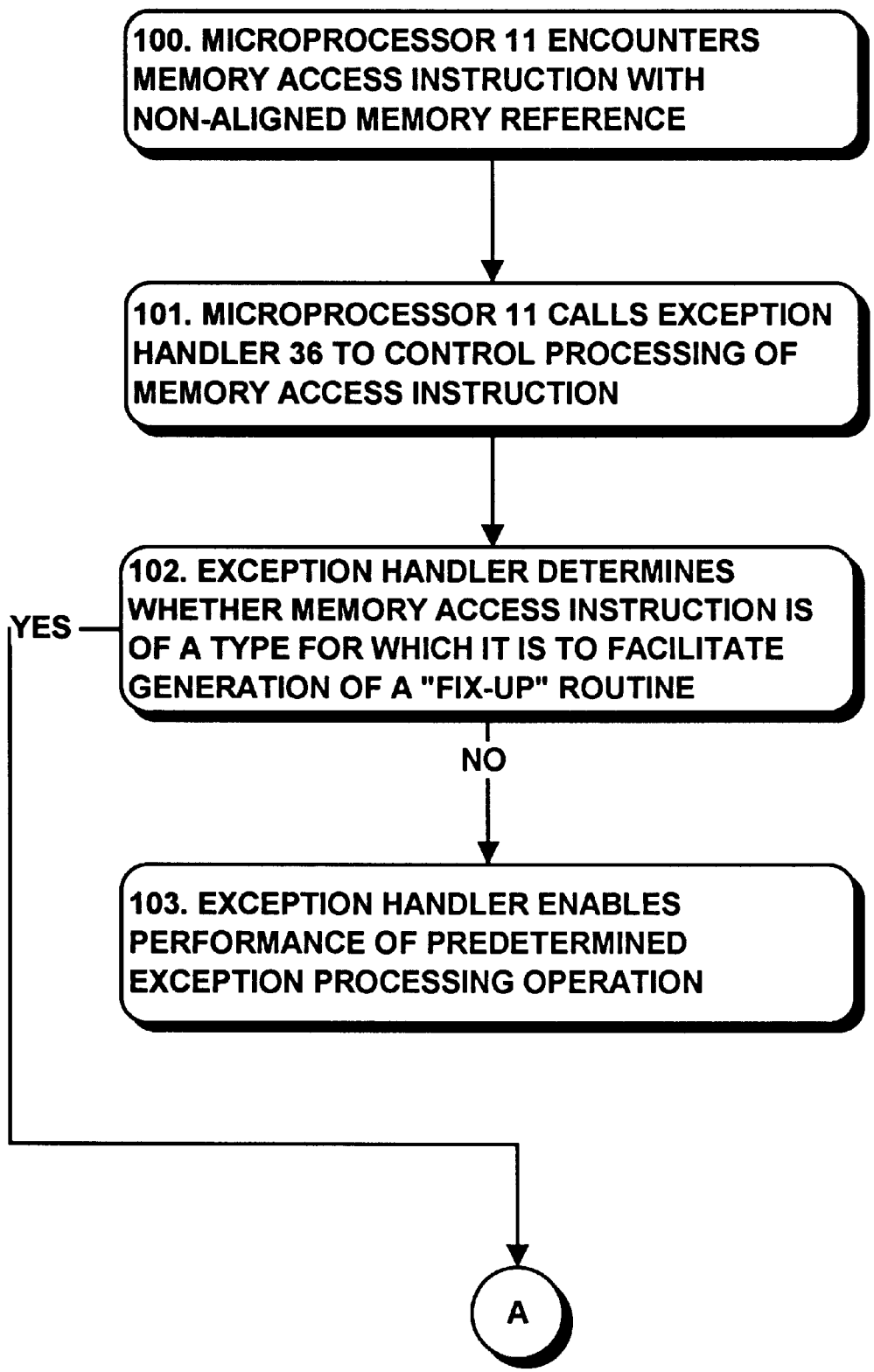
FIG. 4 is a flow chart depicting operations performed by the digital computer system in connection with the invention.

With this background, the detailed operations performed by the exception handler 36 and code generator 35 in connection with the invention will be described in the flow diagram depicted in FIG. 4. With reference to FIG. 4, when the microprocessor 11, while processing the translated program 31 in the execution environment 30, encounters a memory access instruction with a misaligned memory reference (step 100), it (that is, the microprocessor 11) calls the exception handler 36 to control processing of the memory access instruction (step 101). As part of the call, the exception handler 36 is provided with parameters comprising the memory address of the memory access instruction in the translated program 31 with the non-aligned memory reference (which corresponds to the current value of the microprocessor's program counter (not shown)), the memory address of the next instruction in the translated program following the memory access instruction (which normally would correspond to the current value of the microprocessor's program counter 24, incremented by a predetermined value), and the memory address of the data item which gave rise to the misaligned memory reference.

After being called in step 101, the exception handler 36 will initially determine (or more specifically, enable the microprocessor 11 to determine) whether the memory access instruction is of a type for which it is to facilitate generation of a "fix-up" routine, such as that described above in connection with Code Segment C (step 102). In one embodiment, the exception handler 36 may be used in connection with any memory access instruction having a non-aligned memory reference, not just such instructions which may be provided in connection with the translated program 31, and the exception handler 36 will only facilitate generation of a fix-up routine for instructions which are provided in connection with the translated program 31. If the exception handler 36 determines in step 102 that the memory access instruction is not of a type for which it is to facilitate generation of a "fix-up" routine, it will proceed to step 103, in which it will enable the microprocessor 11 to perform a predetermined exception-processing operation. The predetermined exception-processing operation will depend on the particular policy selected for handling memory access instructions having non-aligned memory references, which may comprise, for example, performing the operations described above in connection with Code Segment B, terminating the program which contained the instruction, and so forth.

Returning to step 102, if the exception handler 36 determines in that step that the memory access instruction is of a type for which it is to facilitate generation of a fix-up routine, it will initially determine whether an exception counter 37 exists for the particular memory access instruction (step 110), and if not will establish and initialize an exception counter 37 therefor (step 111). On the other hand, if the exception handler 36 determines that an exception counter 37 exists for the particular memory access instruction, it will increment the exception counter (step 112). Following either step 111 or 112, the exception handler 36 will determine whether the value provided by the exception counter 37 is greater than a predetermined threshold value (step 113). If the exception handler 36 makes a negative determination in step 113, it will control the microprocessor 11 to perform the operations described above in connection with Code Segment B to enable the data item to be retrieved and constructed during a load operation, or disassembled and stored during a store operation, thereby emulating the instruction (step 114), and return control to the translated program, at the instruction following the instruction which gave rise to the exception, using the memory address of the next instruction in the translated program following the memory access instruction (step 115).

On the other hand, if the exception handler 36 makes a positive determination in step 113, it will enable the code generator 35 to generate the "fix-up" code, such as that described above in connection with Code Segment C, and insert the generated code into the translated program (step 116). In that operation, the code generator 35 will receive the memory addresses of the instructions which gave rise to the exception and the next instruction, and the memory address of the non-aligned memory reference. The code generator 35 can use the memory address of the instruction that gave rise to the exception to determine the type of instruction, that is, whether it was a load instruction or a store instruction, and whether it was for a half-word, word, etc. In addition, the code generator can use the memory address of the non-aligned memory reference to determine the manner in which the reference was non-aligned. From this information, the code generator 35 can readily determine the particular operations to be performed, and the code to be generated to perform those operations. In one embodiment, the code generator 35 is essentially provided with a set of template or macros representative of the program code required for each of the type of operation and data item and the manner in which the reference address was misaligned, which can be assembled and appended to the translated program 31 as the fix-up code, and provide the required branch instruction to, and the return branch instruction from, the fix-up code.

After the code generator 35 has performed the operations describe above in connection with step 116, it will return control to the exception handler 36 (step 120), after which the exception handler 36 can return control to the translated program 31 (step 121). In the return operation, the exception handler 36 will use the memory address of the memory access instruction which gave rise to the exception handler 36 being called, which was provided to the exception handler 36 when it was called. Accordingly, the exception handler 36 will return control to the point in the translated program 31 at which the exception condition was detected, illustratively the branch instruction in line (3) of Code Section C. Thus, after control is returned to the translated program 31, if the portion of the translated program 31 which previously included the memory access instruction which gave rise to the non-aligned memory reference exception is again processed, which may occur if the memory access instruction is located in a loop, instead of processing the memory access instruction, the fix-up code in lines (4) through (8) will be processed, which can avoid the necessity of calling the exception handler 36.

The invention provides a number of advantages. In particular, it enables generation of code for handling various types of conditions, which would otherwise necessitate calling of an exception handler, thereby avoiding the overhead that would be encountered by calling the exception handler 36. Accordingly, the invention allows for generation of a translated program 31 from an original program 33, using code such as Code Segment A, which can generally be efficiently executed unless an exceptional condition, such as a non-aligned memory reference, is encountered necessitating the calling of an exception handler. Only if an exceptional condition is actually encountered in processing of the translated code 31 will code, such as Code Segment C, be substituted for the instruction which gave rise to the exceptional condition; the substitute code will be less efficient, but it will avoid the necessity of thereafter calling the exception handler for the instruction which gave rise to the exceptional condition.

It will be appreciated that a number of modifications may be made to the invention as described above. For example, if the fix-up code is always to be generated when an exception is generated, the exception handler 36 and code generator 35 may essentially be combined in a single component, which will be called to generate the fix-up code when the exception is generated. In that case, with reference to FIG. 4, operations can proceed directly from step 101 to 110, since steps 102 and 103 need not be performed.

Furthermore, if the exception handler 36 is to enable generation of fix-up code the first time that the exception is generated, it will be appreciated that exception counter 37 need not be provided.

In addition, the invention may be used in connection with a number of types of exceptional or unusual conditions that may arise in connection with processing of programs. Further, the invention may be used in connection with a variety of programs and programming environments, in addition to those related to emulation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An exceptional condition avoidance system for facilitating avoidance of an exceptional condition of a predetermined type during execution of a program, said exceptional condition avoidance system comprising:

A. an execution environment for executing the program, the program comprising an instruction stream comprising a series of instructions, the execution environment including an exceptional condition detector for detecting an exceptional condition of at least one type resulting from execution of at least one of said instructions in said series;

B. a fix-up code generation subsystem responsive to detection by said execution environment of said exceptional condition for generating fix-up code which, when processed instead of said at least one of said instructions, would avoid said exception, and for substituting said fix-up code in said instruction stream for said at least one of said instructions.

2. An exceptional condition avoidance system as defined in claim 1 in which said fix-up code generation subsystem comprises:

A. a code generator responsive to a code generation request for generating said fix-up code and for substituting said fix-up code in said instruction stream for said at least one of said instructions; and B. an exceptional condition handler responsive to the detection of the exceptional condition for generating said code generation request.

3. An exceptional condition avoidance system as defined in claim 2 in which said exceptional condition handler generates said code generation request after said exceptional condition has been detected a predetermined number of times for said at least one of said instructions.

4. An exceptional condition avoidance system as defined in claim 3 further comprising an exceptional condition counter for generating an exceptional condition value, the exceptional condition handler enabling the exceptional condition counter to increment the exceptional condition value when the exceptional condition is detected, the exceptional condition handler generating said code generation request when the exceptional condition value has a selected correspondence with a threshold value.

5. An exceptional condition avoidance system as defined in claim 4 in which the exceptional condition handler establishes and initializes said exceptional condition counter when the exceptional condition is detected in connection with said at least one of said instructions.

6. An exceptional condition avoidance system as defined in claim 3 in which said exceptional condition handler emulates said at least one of said instructions in response to said exceptional condition being detected, prior to generation of said code generation request.

7. An exceptional condition avoidance system as defined in claim 2 in which said exceptional condition handler comprises:

A. an exceptional condition counter establishment element for establishing an exceptional condition counter in response to a counter establishment enabling indication, the exceptional condition counter providing an exceptional condition count value;

B. an exceptional condition counter control element for generating said counter establishment enabling indication to enable said exceptional condition counter establishment element to establish said exceptional counter when the exceptional condition is first detected in connection with said at least one of said instructions, and for enabling said exceptional condition counter to increment the exceptional condition count value when the exceptional condition is thereafter detected in connection with the at least one of said instructions; and C. a code generation request generator for generating said code generation request when the exceptional condition count value has a selected relationship with a threshold value.

8. An exceptional condition avoidance system as defined in claim 2 in which said code generator comprises:

A. at least one fix-up code template representative of program code for enabling emulation of said at least one of said instructions; and B. a fix-up code insertion element for using the fix-up code template to generate said program code for enabling emulation of said at least one of said instructions and substituting said program code for said at least one of said instructions in said instruction stream.

9. An exceptional condition avoidance system as defined in claim 8 in which said at least one of said instructions is a memory access instruction, the memory access instruction enabling a memory access operation in connection with a memory reference, the memory access instruction giving rise to a said exceptional condition of a non-aligned memory reference exception type if the memory reference is in a non-aligned condition, the at least one fix-up code template being representative of program code for enabling a plurality of memory access operations each in connection with an aligned memory reference thereby to avoid a said exceptional condition of said non-aligned memory reference exception type.

10. An exceptional condition avoidance system as defined in claim 9 in which there are a plurality of non-aligned memory reference exception types each associated with one of a plurality of non-aligned conditions, A. said code generator comprising a plurality of fix-up code templates each representative of program code for enabling emulation of a memory access instruction for which the memory reference has one of said non-aligned conditions, and B. the execution handler, in response to detection of an exceptional condition of one of said plurality of non-aligned memory reference exception types, enabling the code generator to select one of the fix-up code templates associated with the one of the non-aligned conditions associated with the non-aligned memory reference exception type of the detected exceptional condition for use in generating program code.

11. A method for facilitating avoidance of an exceptional condition of a predetermined type during execution of a program, said method comprising:

A. providing an execution environment for executing the program, the program comprising an instruction stream comprising a series of instructions, the execution environment including an exceptional condition detector for detecting an exceptional condition of at least one type resulting from execution of at least one of said instructions in said series;

B. in response to detection by said execution environment of said exceptional condition, generating fix-up code which, when processed instead of said at least one of said instructions, would avoid said exceptional condition, and substituting said fix-up code in said instruction stream for said at least one of said instructions.

12. A method as defined in claim 11 in which said fix-up code generation step comprises the steps of:

A. generating a code generation request in response to the detection of the exceptional condition; and B. in response to a code generation request, generating said fix-up code and substituting said fix-up code in said instruction stream for said at least one of said instructions.

13. A method as defined in claim 12 in which said code generation request is generated after said exceptional condition has been detected a predetermined number of times for said at least one of said instructions.

14. A method as defined in claim 13 further comprising the step of providing an exceptional condition counter for generating an exceptional condition value, code generation request step including the steps of A. enabling the exceptional condition counter to increment the exceptional condition value when the exceptional condition is detected, and B. generating said code generation request when the exceptional condition value has a selected correspondence with a threshold value.

15. A method as defined in claim 14 in which the exception condition counter is established and initialized when the exceptional condition is detected in connection with said at least one of said instructions in said instruction stream.

16. A method as defined in claim 13 further comprising the step of emulating said at least one of said instructions in response to said exceptional condition being detected, prior to generation of said code generation request.

17. A method as defined in claim 12 in which said code generation request step comprises the steps of:

A. establishing an exceptional condition counter in response to a counter establishment enabling indication, the exceptional condition counter providing an exceptional condition count value;

B. generating the counter establishment enabling indication to enable the establishment of said exceptional counter when the exceptional condition is first detected in connection with said at least one of said instructions, and enabling said exceptional condition counter to increment the exceptional condition count value when the exceptional condition is thereafter detected in connection with the at least one of said instructions; and C. generating said code generation request when the exceptional condition count value has a selected relationship with a threshold value.

18. A method as defined in claim 12 in which said code generation step comprises the steps of:

A. providing at least one fix-up code template representative of program code for enabling emulation of said at least one of said instructions; and B. using the fix-up code template to generate said program code for enabling emulation of said at least one of said instructions and substituting said program code for said at least one of said instructions in said instruction stream.

19. A method as defined in claim 18 in which said at least one of said instructions is a memory access instruction, the memory access instruction enabling a memory access operation in connection with a memory reference, the memory access instruction giving rise to a said exceptional condition of a non-aligned memory reference exception type if the memory reference is in a non-aligned condition, the at least one fix-up code template being representative of program code for enabling a plurality of memory access operations each in connection with an aligned memory reference thereby to avoid a said exceptional condition of said non-aligned memory reference exception type.

20. A method as defined in claim 19 in which there are a plurality of non-aligned memory reference exception types each associated with one of a plurality of non-aligned conditions, A. a plurality of fix-up code templates being provided, each representative of program code for enabling emulation of a memory access instruction for which the memory reference has one of said non-aligned conditions, and B. the code generation request step including the step of, in response to detection of an exceptional condition of one of said plurality of non-aligned memory reference exception types, enabling the use of one of the fix-up code templates associated with the one of the non-aligned conditions associated with the non-aligned memory reference exception type of the detected exceptional condition in generating program code.

21. An exceptional condition avoidance computer program product for use in connection with a computer for facilitating avoidance of an exceptional condition of a predetermined type during execution of a program, said computer providing an execution environment for executing the program, the program comprising an instruction stream comprising a series of instructions, the execution environment including an exceptional condition detector for detecting an exceptional condition of at least one type resulting from execution of at least one of said instructions in said series, said exceptional condition avoidance computer program product comprising a computer readable medium having encoded thereon fix-up code generation code devices for enabling the computer, in response to detection by said execution environment of said exceptional condition, to generate fix-up code which, when processed instead of said at least one of said instructions, would avoid said exceptional condition, and to substitute said fix-up code in said instruction stream for said at least one of said instructions.

22. An exceptional condition avoidance computer program product as defined in claim 21 in which said fix-up code generation code devices comprises:
   A. a code generator responsive to a code generation request code devices for enabling said computer to generate said fix-up code and to substitute said fix-up code in said instruction stream for said at least one of said instructions; and
   B. exceptional condition handler code devices for enabling the computer to generate said code generation request in response to the detection of the exceptional condition.

23. An exceptional condition avoidance computer program product as defined in claim 22 in which said exceptional condition handler code devices enables said computer to generate said code generation request after said exceptional condition has been detected a predetermined number of times for said at least one of said instructions.

24. An exceptional condition avoidance computer program product as defined in claim 23 further comprising exceptional condition counter code devices for enabling the computer to generate an exceptional condition value, the exceptional condition handler code devices enabling the computer to increment the exceptional condition value when the exceptional condition is detected, the exceptional condition handler code devices enabling the computer to generate said code generation request when the exceptional condition value has a selected correspondence with a threshold value.

25. An exceptional condition avoidance computer program product as defined in claim 24 in which the exceptional condition handler code devices enables the computer to use said exceptional condition counter code devices and initialize exceptional condition value when the exceptional condition is detected in connection with said at least one of said instructions in said instruction stream.

26. An exceptional condition avoidance computer program product as defined in claim 23 in which said exceptional condition handler enables the computer to emulate said at least one of said instructions in response to said exceptional condition being detected, prior to generation of said code generation request.

27. An exceptional condition avoidance computer program product as defined in claim 22 in which said exceptional condition handler code devices comprises:
   A. exceptional condition counter establishment code devices for enabling the computer to establish an exceptional condition counter in response to a counter establishment enabling indication, the exceptional condition counter providing an exceptional condition count value;
   B. exceptional condition counter control code devices for enabling the computer to generate said counter establishment enabling indication to enable the establishment of said exceptional counter when the exceptional condition is first detected in connection with said at least one of said instructions, and for enabling incrementation of the exceptional condition count value when the exceptional condition is thereafter detected in connection with the at least one of said instructions; and
   C. code generation request generation code devices for enabling the computer to generate said code generation request when the exceptional condition count value has a selected relationship with a threshold value.

28. An exceptional condition avoidance computer program product as defined in claim 22 in which said code generator code devices comprises:
   A. at least one fix-up code template representative of program code for enabling the computer to emulate said at least one of said instructions; and
   B. fix-up code insertion code devices for enabling the computer to use the fix-up code template to generate said program code for enabling emulation of said at least one of said instructions and substituting said program code for said at least one of said instructions in said instruction stream.

29. An exceptional condition avoidance computer program product as defined in claim 28 in which said at least one of said instructions is a memory access instruction, the memory access instruction enabling a memory access operation in connection with a memory reference, the memory access instruction giving rise to a said exceptional condition of a non-aligned memory reference exception type if the memory reference is in a non-aligned condition, the at least one fix-up code template being representative of program code for enabling a plurality of memory access operations each in connection with an aligned memory reference thereby to avoid a said exceptional condition of said non-aligned memory reference exception type.

30. An exceptional condition avoidance computer program product as defined in claim 29 in which there are a plurality of non-aligned memory reference exception types each associated with one of a plurality of non-aligned conditions,
   A. said code generator code devices comprising a plurality of fix-up code templates each representative of program code for enabling emulation of a memory access instruction for which the memory reference has one of said non-aligned conditions, and
   B. the execution handler code devices enable the computer to, in response to detection of an exceptional condition of one of said plurality of non-aligned memory reference exception types, enable the computer to, while processing the code generator code devices, select one of the fix-up code templates associated with the one of the non-aligned conditions associated with the non-aligned memory reference exception type of the detected exceptional condition for use in generating program code.

31. A system comprising:
A. a computer; and
B. a control subsystem for controlling the computer, the control subsystem comprising:
   i. an execution environment for enabling said computer to execute a program, the program comprising an instruction stream comprising a series of instructions, the execution environment including an exceptional condition detector for detecting an exceptional condition of at least one type resulting from execution of at least one of said instructions in said instruction stream; and
   ii. a fix-up code generation subsystem for enabling said computer to, in response to detection by said execution environment of said exceptional condition, generate fix-up code which, when processed instead of said at least one of said instructions, would avoid said exceptional condition, and to substitute said fix-up code in said instruction stream for said at least one of said instructions.

32. A control subsystem for controlling a computer, the control subsystem comprising:
- A. an execution environment for enabling said computer to execute a program, the program comprising an instruction stream comprising a series of instructions, the execution environment including an exceptional condition detector for detecting an exceptional condition of at least one type resulting from execution of at least one of said instructions in said instruction stream; and
- B. a fix-up code generation subsystem for enabling said computer to, in response to detection of said exceptional condition, generate fix-up code which, when processed instead of said at least one of said instructions, would avoid said exceptional condition, and substitute said fix-up code in said instruction stream for said at least one of said instructions.

33. A fix-up code generation subsystem control subsystem for controlling a computer, the computer providing an execution environment for enabling said computer to execute a program, the program comprising an instruction stream comprising a series of instructions, the execution environment including an exceptional condition detector for detecting an exceptional condition of at least one type resulting from execution of at least one of said instructions in said instruction stream, the fix-up code generation subsystem control subsystem including:
- A code generator element for enabling the computer, in response to a code generation request, to generate fix-up code which, when processed instead of said at least one of said instructions, would avoid said exceptional condition, and substitute said fix-up code in said instruction stream for said at least one of said instructions; and
- B. an exceptional condition handler element for enabling the computer to, in response to the detection of the exceptional condition resulting from execution of said at least one of said instructions, generate said code generation request.

* * * * *